United States Patent [19]

Kawabata et al.

[11] Patent Number: 5,198,970

[45] Date of Patent: Mar. 30, 1993

[54] A.C. POWER SUPPLY APPARATUS

[75] Inventors: Takao Kawabata; Nobuo Sashida, both of Hyogo, Japan

[73] Assignee: Mitsubishi Denki Kabushiki Kaisha, Tokyo, Japan

[21] Appl. No.: 798,833

[22] Filed: Nov. 25, 1991

Related U.S. Application Data

[63] Continuation of Ser. No. 318,240, Mar. 3, 1989, abandoned.

[30] Foreign Application Priority Data

Apr. 27, 1988 [JP] Japan ................................ 63-106987

[51] Int. Cl.$^5$ ............................................. H02M 5/45
[52] U.S. Cl. ........................................ 363/37; 307/66
[58] Field of Search ...................... 363/37, 98, 132; 307/46, 66, 67

[56] References Cited

U.S. PATENT DOCUMENTS

| | | | |
|---|---|---|---|
| 4,465,943 | 8/1984 | Risberg | 307/67 |
| 4,707,774 | 11/1987 | Kajita | 363/37 |
| 4,719,550 | 1/1988 | Powell et al. | 363/37 |

FOREIGN PATENT DOCUMENTS

| | | | |
|---|---|---|---|
| 0039139 | 3/1977 | Japan | 307/66 |
| 8501842 | 4/1985 | PCT Int'l Appl. | 307/66 |
| 2111326 | 6/1983 | United Kingdom | 307/66 |

OTHER PUBLICATIONS

T. Kawabata, "Classification and Characteristics of Inverters," Electric Review, pp. 987-992, Nov. 1981.
K. Harada et al., "Small UPS Using Phase Control", Converence Proceedings of Intelec/87, pp. 516-520, 1987.

Primary Examiner—Steven L. Stephan
Assistant Examiner—Kristine Peckman
Attorney, Agent, or Firm—Rothwell, Figg, Ernst & Kurz

[57] ABSTRACT

An a.c. power supply apparatus, such as an uninterruptible power supply apparatus or a fuel cell power generation apparatus, has first, second and third converting devices connected in star configuration with a common bus, whereby the number of power converting devices is reduced and a compact, light weight and efficient power supply apparatus is realized.

8 Claims, 7 Drawing Sheets (a)
V_RS (b)
CONTROL SIGNAL (c)
Vx (d)
SWITCH TURNED ON

A.C. POWER SUPPLY APPARATUS

This is a continuation of application Ser. No. 07/318,240, filed Mar. 3, 1989 now abandoned.

BACKGROUND OF THE INVENTION

1. Field of the Invention

The present invention relates to an a.c. power supply apparatus such as an uninterruptible power supply (UPS) or a fuel cell power generation apparatus.

2. Description of the Prior Art

FIG. 1 shows the arrangement of a typical conventional UPS. In the figure, a charger 3 converts a.c. power of frequency $f_2$, received through a transformer $T_1$ from a commercial power source 5, into d.c. power, and supplies the d.c. power to a voltage-type inverter 1 while charging a battery 2.

The inverter 1 converts the d.c. power into a.c. power of frequency $f_3$ including a less amount of low-order harmonics. The a.c. power is made sinusoidal by being fed through a filter constructed of an inductor $L_s$ and capacitor $C_p$, and, by being fed through a transformer $T_2$ so as to meet a load voltage, it is supplied to a load 4.

Generally, the load of a UPS, e.g., a computer, is isolated from the power source line for protection against noise and is provided with an exclusive ground, in most cases, and therefore the transformer $T_1$ is required for the purpose of power line isolation as well as voltage matching.

Although, in some cases, the input power transformer $T_1$ is omitted, the charger 3 has its d.c. output voltage determined on the basis of economy of the inverter 1 and battery 2, and therefore the transformer $T_1$ is used to provide a proper voltage for the inverter and also to isolate the load line from the power source line, in most cases.

Accordingly, a conventionally designed UPS necessitates two heavy bulky transformers, and thus preventing the reduction in the size and weight of the UPS.

An advanced apparatus which has been developed with the intention of overcoming the above problem is the high-frequency intermediate link method power supply as shown in FIG. 2. The UPS apparatus shown in FIG. 2, which functions similar to that of FIG. 1, is based on the high-frequency intermediate link DC/AC inverter disclosed in an article entitled "Classification of Inverters and Their Characteristics", Electric Review, FIG. 14, pp. 987–992, November 1981.

In the figure, inverter 1 is a voltage-type inverter producing a single-phase rectangular waveform of $f_1 = 10$ kHz for example, and it supplies the output to a cycloconverter 6 through a transformer $T_2$ for isolation. The cycloconverter 6 converts the frequency of a.c. power from $f_1$ to $f_3 = 60$ Hz for example, and the power is fed through a filter constructed of an inductor $L_s$ and capacitor $C_p$, so that it becomes sinusoidal, and supplied to a load 4. This apparatus has its transformer $T_2$ designed to operate at 10 kHz, and therefore it can be compact and light weight. However, the apparatus still necessitates a transformer $T_1$ of the commercial power frequency $f_2$ for a charger 3, as in the case of FIG. 1.

FIG. 3 shows a more advanced apparatus, in which the same high-frequency intermediate link method is further applied to the charger 3 in consideration that the DC/AC inverter of FIG. 2 is reversible. Although this apparatus can have compact transformers, power is transmitted through two cycloconverters 6 and 8 and two inverters 1 and 7 between the commercial power input and power output, resulting in a degraded efficiency and increased cost of an additional converter. Accordingly, the apparatus of FIG. 3 is less practical from the viewpoint of economy and efficiency.

A more innovative apparatus intended to overcome the above deficiencies is offered in an article entitled "Small UPS Using Phase Control", INTELEC '87 Conference Proceedings, Session 12, FIG. 16(b) in pp. 516–520. The apparatus, which does not necessitate a charger, is shown in FIG. 4 in the same depictive manner as of FIGS. 1 through 3.

In this apparatus, when the commercial power source 5 is normal, a.c. power of frequency $f_2$ from the commercial power source 5 is directly supplied through a switch SW to the load 4 and at the same time fed to a cycloconverter 6 through a filter formed of an inductor $L_s$ and capacitor $C_p$. The converter 6 converts the power to have a frequency $f_1$, which is fed through a transformer $T_2$ to an inverter 1, which then produces d.c. power to charge the battery 2.

When the commercial power source 5 is out, the switch SW is opened so that power of the battery 2 is fed through the inverter 1, transformer $T_2$, cycloconverter 6 and filter and supplied to the load 4.

This apparatus is highly practical because of its need of only two converting devices, however, power with the same voltage and frequency as the commercial power source is supplied to the load 4, and therefore it is not suited to applications which require a precise voltage and constant frequency.

SUMMARY OF THE INVENTION

It is an object of this invention to provide an a.c. power supply apparatus which is compact, light weight, efficient and economical by using a small number of converting devices.

In order to achieve the above objective, the inventive a.c. power supply apparatus comprises a first converting device which converts a.c. power of a second frequency into power of a first frequency higher than the second frequency and supplies the converted power to a power bus, a second converting device, with the ability of reversible power conversion, which converts a d.c. power into a.c. power of the first frequency and supplies the converted power to the power bus, and a third converting device which is supplied with power from at least one of the first and second converting devices through the power bus and adapted to convert the power to have a third frequency and supply the converted power to a load, whereby the apparatus is highly efficient and economical owing to the smaller number of converting devices.

DETAILED DESCRIPTION OF THE PREFERRED EMBODIMENTS

Preferred embodiments of this invention will be described in detail with reference to the accompanying drawings.

Figure 1:
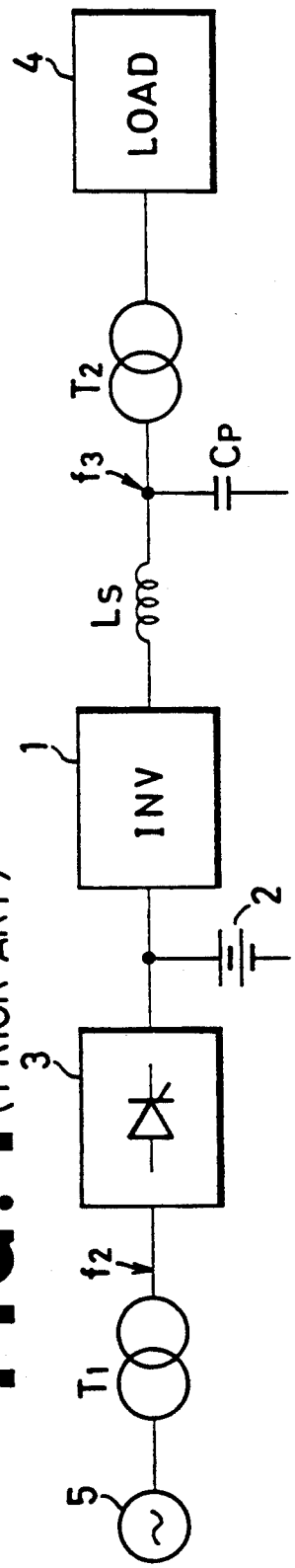
FIG. 1 is a block diagram showing the arrangement of one conventional a.c. power supply apparatus.
Figure 2:
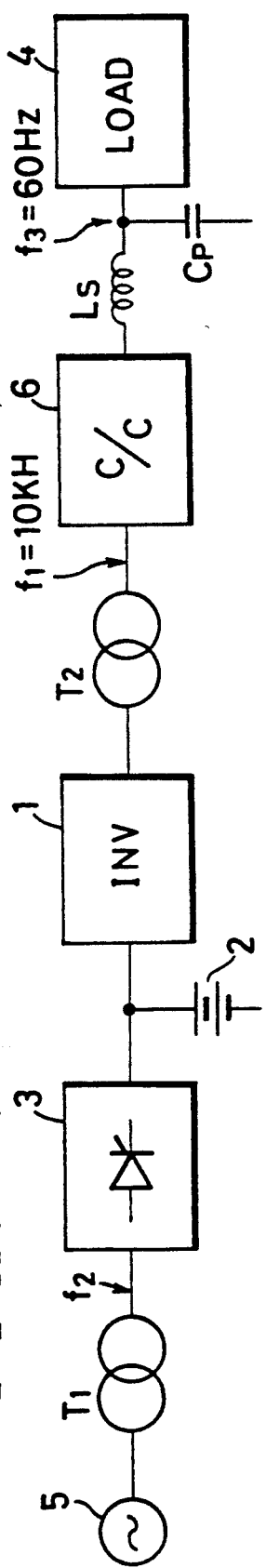
FIG. 2 is a block diagram showing the arrangement of a conventional a.c. power supply apparatus based on the high-frequency intermediate link method.
Figure 3:
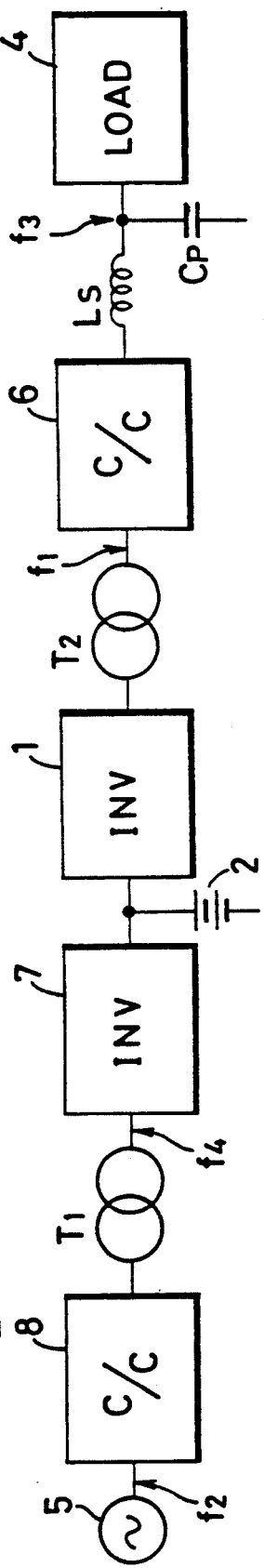
FIGS. 3 and 4 are block diagrams showing other arrangements of conventional a.c. power supply apparatus.
Figure 4:
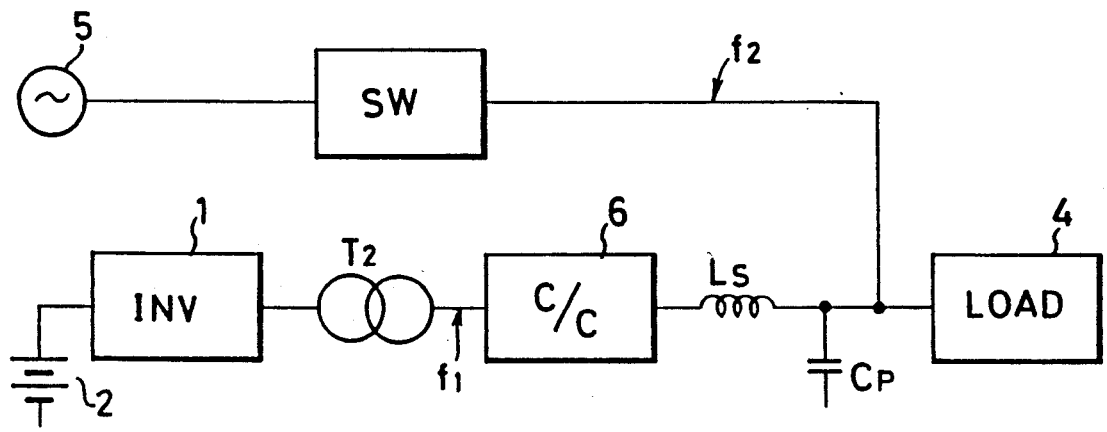
Figure 5:
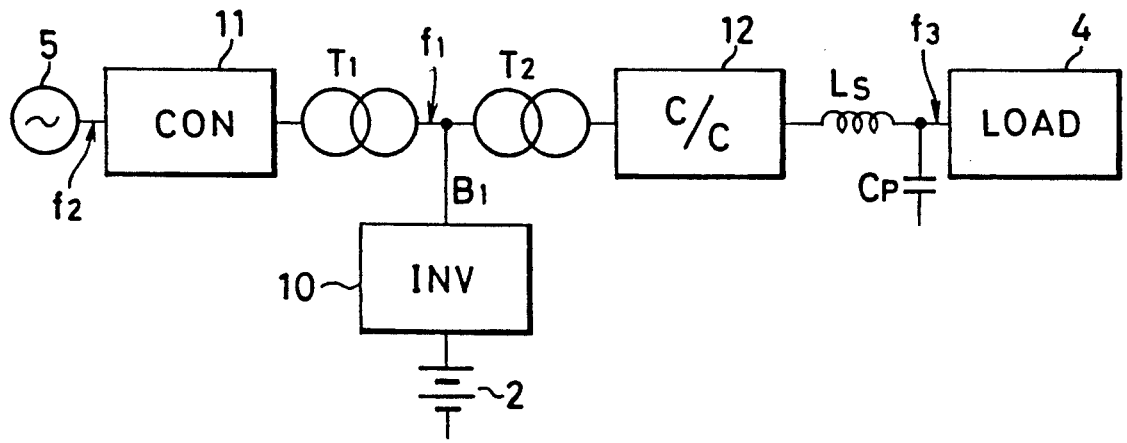
FIG. 5 is a block diagram showing the inventive a.c. power supply apparatus as one embodiment of the present invention.

FIG. 5 shows in block diagram the inventive a.c. power supply apparatus, in which indicated by 10 is an inverter, 11 is a converting device, and 12 is a cycloconverter. The remaining functional blocks identical to those of FIGS. 1 through 4 are referred to by the common symbols and explanation thereof will not be repeated.

Figure 6:
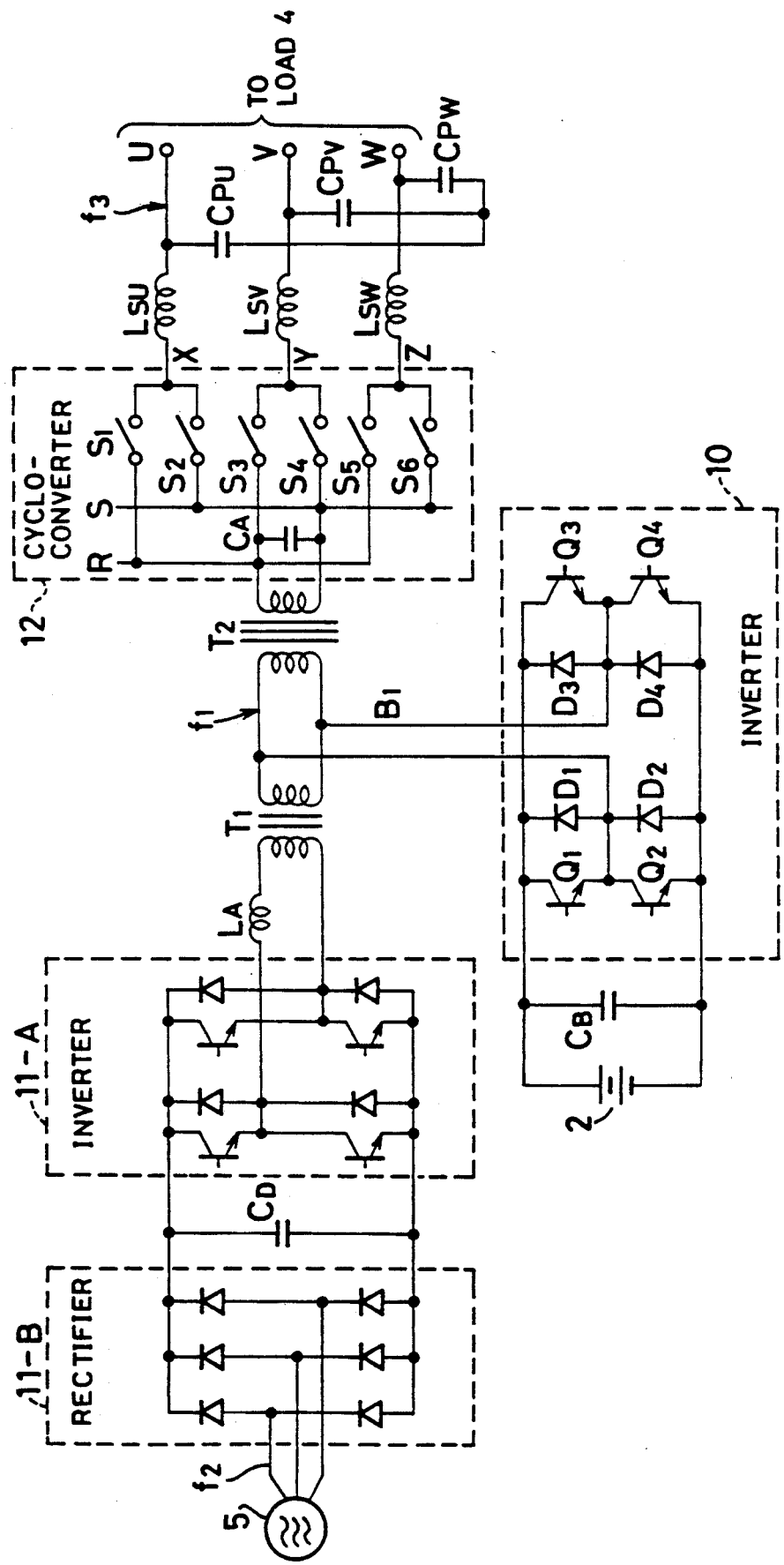
FIG. 6 is a circuit diagram of the apparatus shown in FIG. 5.

FIG. 6 shows a circuit diagram of the apparatus shown in FIG. 5. In FIG. 6, the inverter 10 is a rectangular-wave inverter made up of transistors Q1–Q4 and diodes D1–D4, and it supplies a rectangular-wave voltage derived from the voltage of the battery 2 to a bus $B_1$. The inverter 10 does not have voltage control and has its frequency fixed, and it establishes the voltage and frequency on the bus $B_1$ as reference values for the whole apparatus.

The converting device 11 is constructed of a diode rectifier 11-B, a transistor inverter 11-A and a capacitor $C_D$, and it operates to convert a.c. power of the commercial power source 5 into a.c. power with the same frequency as that of the inverter 10. The inverter 11-A has PWM (pulse width modulation) control and phase control for its output voltage with respect to the bus $B_1$ voltage, thereby controlling the output power fed to the bus $B_1$ and also controlling power for charging the battery 2 through the inverter 10 and the power delivered to the load through the cycloconverter 12.

The reactor $L_A$ has an impedance of several % to 30% P.U., and the purpose thereof is to suppress harmonic currents caused by the difference between the non-controlled rectangular wave on the bus $B_1$ and the PWM wave produced by the inverter 11-A and also to facilitate the control of the power fed from the inverter 11-A to the bus $B_1$.

Figure 7A:
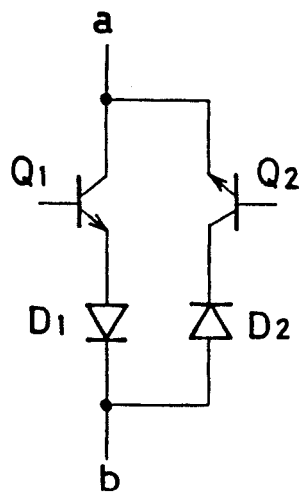
FIGS. 7(a) and 7(b) are a circuit diagrams of switching circuits used in the cycloconverter of FIG. 6.
Figure 7B:
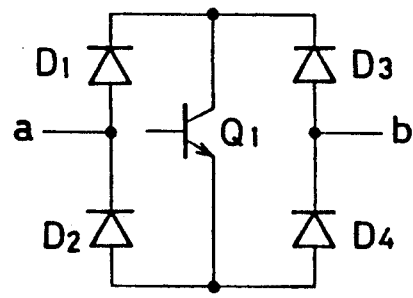

Since the voltage on the bus $B_1$ is fixed to the virtually completely rectangular wave by the battery 2 and a smoothing capacitor $C_B$ in parallel connection with it, the cycloconverter 12 operates independently of the inverter 11-A and without mutual influence. With $f_1$ being set to several kHz or above and $f_3$ being set to 60 Hz, the cycloconverter 12 can be either the line commutation type or self commutation type. Switches S1–S6 may be of the self commutation type as shown by FIG. 7(a) and FIG. 7(b).

The operation of the embodiment shown in FIG. 6, particularly the operation of the cycloconverter 12, will be explained in more detail. By designing the transformer $T_2$ to have a sufficiently small leakage inductance, it produces on the secondary winding the same rectangular wave as that on the bus $B_1$, as shown by (a) in FIG. 8. A surge absorbing capacitor $C_A$ is provided to facilitate the switching of the cycloconverter 12.

Figure 8:
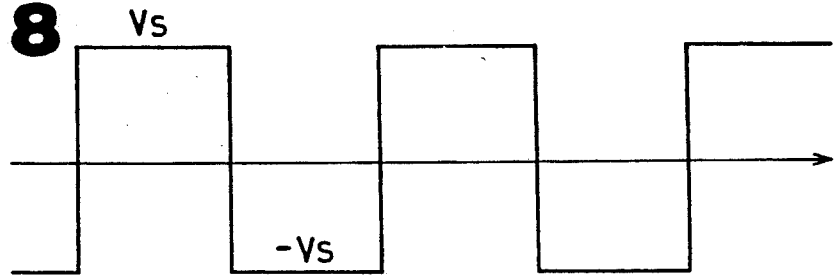
FIG. 8 is a waveform diagram used to explain the operation of the cycloconverter.
Figure 8:
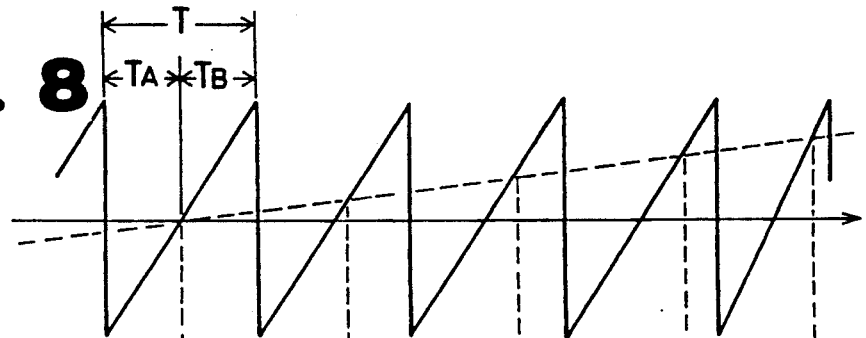
Figure 8:
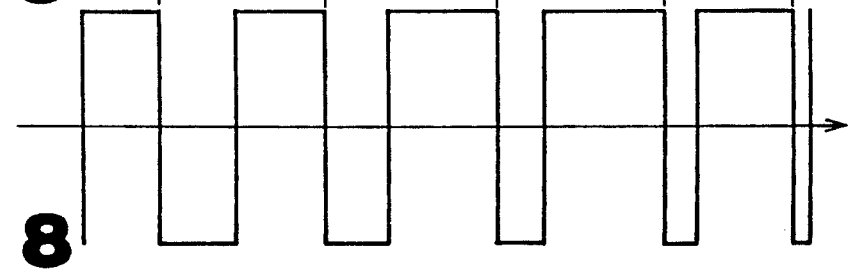
Figure 8:
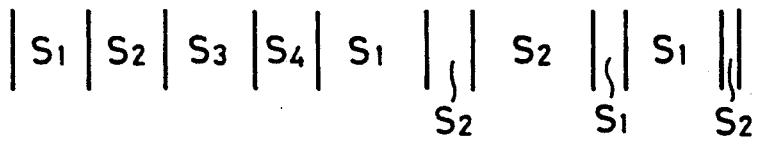

In the first positive half cycle of $V_{RS}$ in FIG. 8, closing the switch S1 provides a positive voltage at point X, or closing the switch S2 provides a negative voltage at point X. In a negative half cycle of $V_{RS}$, the same voltages appear at point X by switching S1 and S2 vice versa. Closing S1 and S2 simultaneously results in a short-circuit on the transformer secondary winding and it must be avoided, while leaving both S1 and S2 open results in the absence of a current path for the reactor $L_{SU}$ and must be avoided.

In a half cycle of the secondary voltage $V_{RS}$ of the transformer $T_2$ shown in (a) of FIG. 8, a saw-tooth wave as shown in (b) of FIG. 8 is generated, so that the timing of switching S1 and S2 is determined at the intersection of the saw-tooth wave and a control signal level shown by the dashed line. As shown by (c) of FIG. 8, the voltage $V_X$ of the point X relative to the virtual neutral point, which may be the center tap of the secondary winding of $T_2$, increases progressively as the control signal level rises. It will be understood from the figure that the timing of switching is determined from the relation of the levels of the saw-tooth wave and control signal and from the polarity of the voltage $V_{RS}$.

For a positive half cycle of T at R relative to S, where $T=1/(2f_1)$, when the switch S1 is closed in the former half $T_A$ of that period and the switch S2 is closed in the latter half $T_B=T-T_A$, the average voltage of the point X relative to the virtual neutral point N in the period T is evaluated as follows.

$$V_X = V_S(2T_A/T - 1)$$

where $V_S$ is the voltage between R and S. Accordingly, by controlling the $T_A$, the average voltage at point X can be varied in a range from $-V_S$ to $V_S$.

These are the operations of the U-phase of the cycloconverter in FIG. 6. The V-phase and W-phase are also provided with comparators for comparing the saw tooth wave so as to control a switch pair S3 and S4 and another switch pair S5 and S6, respectively. By applying the control signals corresponding to the intended 3-phase output voltage to the three comparators, the voltages at points X, Y and Z have their mean values varying in 3-phase sinusoidal waveforms, and, after being fed through the filters, the 3-phase sinusoidal voltages are delivered to the output terminals U, V and W.

Figure 9:
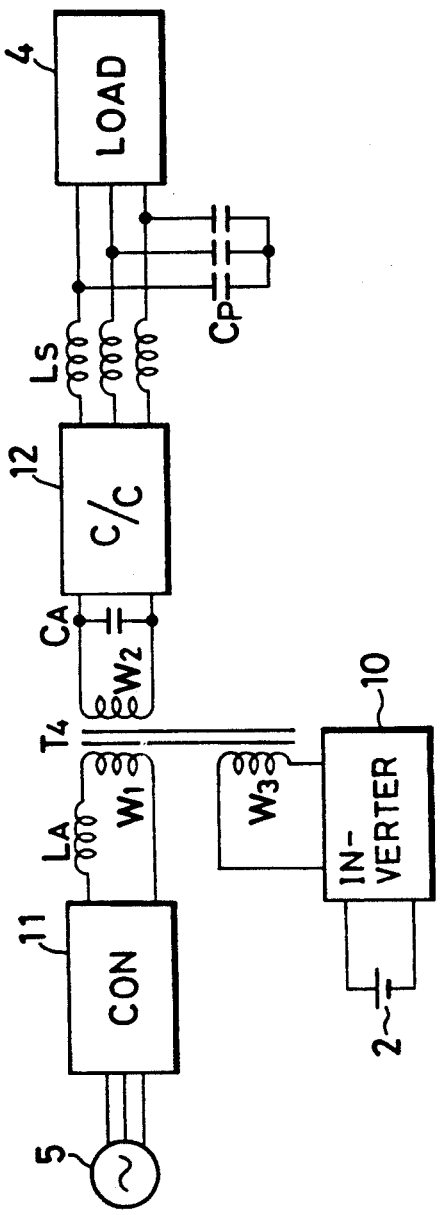
FIGS. 9 and 10 are block diagrams showing other embodiments of this invention.

The two transformers $T_1$ and $T_2$ used in the embodiment of FIG. 6 can be integrated to a single transformer $T_4$ as shown in FIG. 9, in which the remaining portions identical to those of FIG. 6 are drawn as blocks. In the figure, the transformer $T_4$ has three windings, and the output of the converting device 11 is mostly fed through the windings $W_1$ and $W_2$ to the cycloconverter 12. The output is partially fed through the winding $W_3$ and rendered by AC/DC conversion of the reverse operation of the inverter 10 a DC voltage thereby to charge the battery 2.

In the occurrence of a power outage, the inverter 10 performs DC/AC conversion on the power output of battery 2, and it is supplied through the windings $W_3$ and $W_2$ to the cycloconverter 12. Accordingly, the apparatus of FIG. 9 always transmits power through only one transformer $T_4$, and it is superior in efficiency and economy. It is also possible in FIG. 9 to connect the output of the inverter 10 to the winding $W_1$ or $W_2$, with the winding $W_3$ being omitted.

In the above explanation, the inverter 10 is operated uninterruptedly, while an alternative apparatus is possible in which the inverter 10 is operated only during a power outage. In this case, a larger capacitor $C_A$ of 40–100% PU is used so as to stabilize the bus $B_1$ voltage to be sinusoidal during the operation of the inverter 10. In order to absorb the voltage difference between the sinusoidal wave of the bus $B_1$ and the rectangular-wave of the inverter 10, it is recommended to provide a reactor of 20–30% PU in series to the output of the inverter 10. The cycloconverter 12 implements phase control on the basis of the varying single-phase sinusoidal wave on the bus $B_1$, thereby producing 3-phase sinusoidal waves.

It is also possible for this embodiment to charge the battery 2 as follows. The inverter 11-A has PWM control to change the voltage of the bus $B_1$, which is rectified by the diodes D1–D4 of the inverter 10 to charge the battery 2. In this operation, the transistors Q1–Q4 are kept in the cutoff state. In the occurrence of a power outage, the inverter 10 is activated immediately so that the bus voltage is retained. In this case, even though the battery voltage is varied by the PWM control of the inverter 10, the voltage on the bus $B_1$ can be maintained constant.

Figure 10:
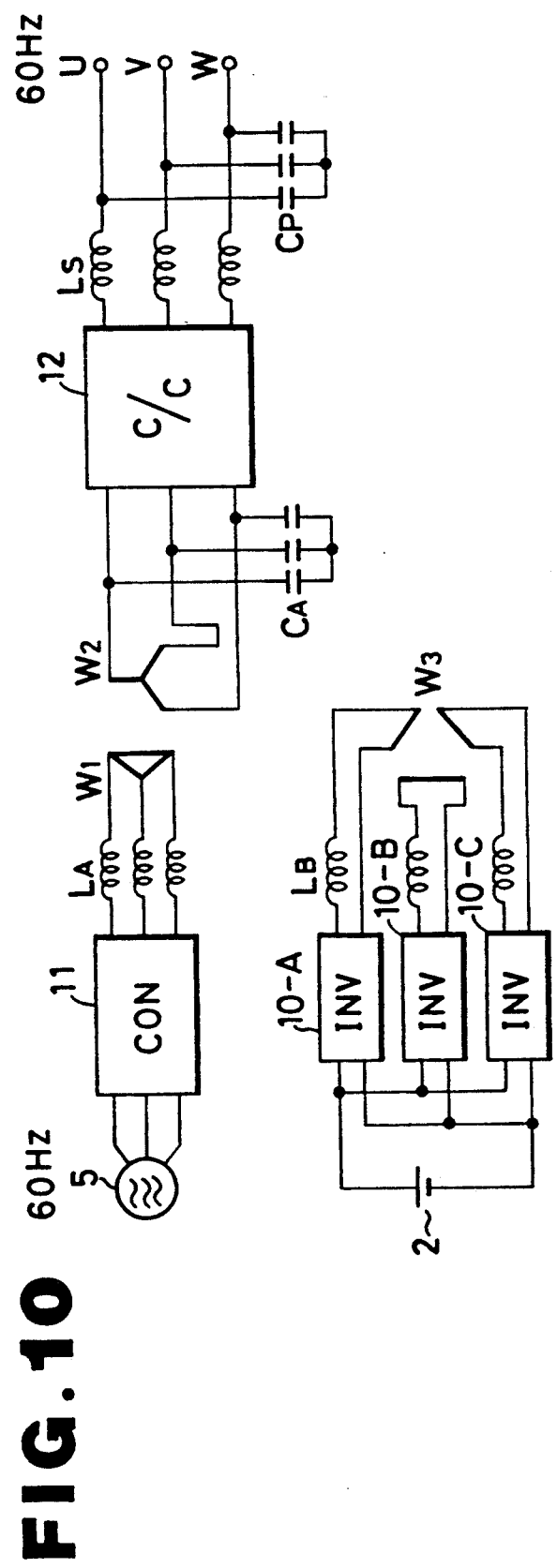

Although the inverter 10 is a single-phase inverter in the foregoing embodiment, it is known that the cycloconverter 12 is operable on a 3-phase sinusoidal-wave power source. Accordingly, the inverter 10 and the converter 11 in FIG. 9 can be replaced with a 3-phase sinusoidal-wave inverter as shown in FIG. 10. In the figure, the 3-phase inverter and a 3-phase converter, respectively consists of three single-phase bridge inverters 10-A, 10-B and 10-C operating under pulse width control of a 1-pulse PWM signal to maintain the voltage of capacitors $C_A$ irrespective of the voltage variation on the battery 2.

The converting device 11 controls the phase of its output voltage relative to the voltage of the capacitors $C_A$, thereby regulating power introduced to the winding $W_1$ through the reactors $L_A$. The cycloconverter 12 produces stabilized 3-phase, 60 Hz power terminals U, V and W on the basis of the stabilized high-frequency 3-phase voltages established on the capacitors $C_A$. The apparatus with a 3-phase intermediate link provides a satisfactory output waveform even with a relatively low intermediate link frequency, and it is suitable for a large-capacity power UPS.

Figure 11:
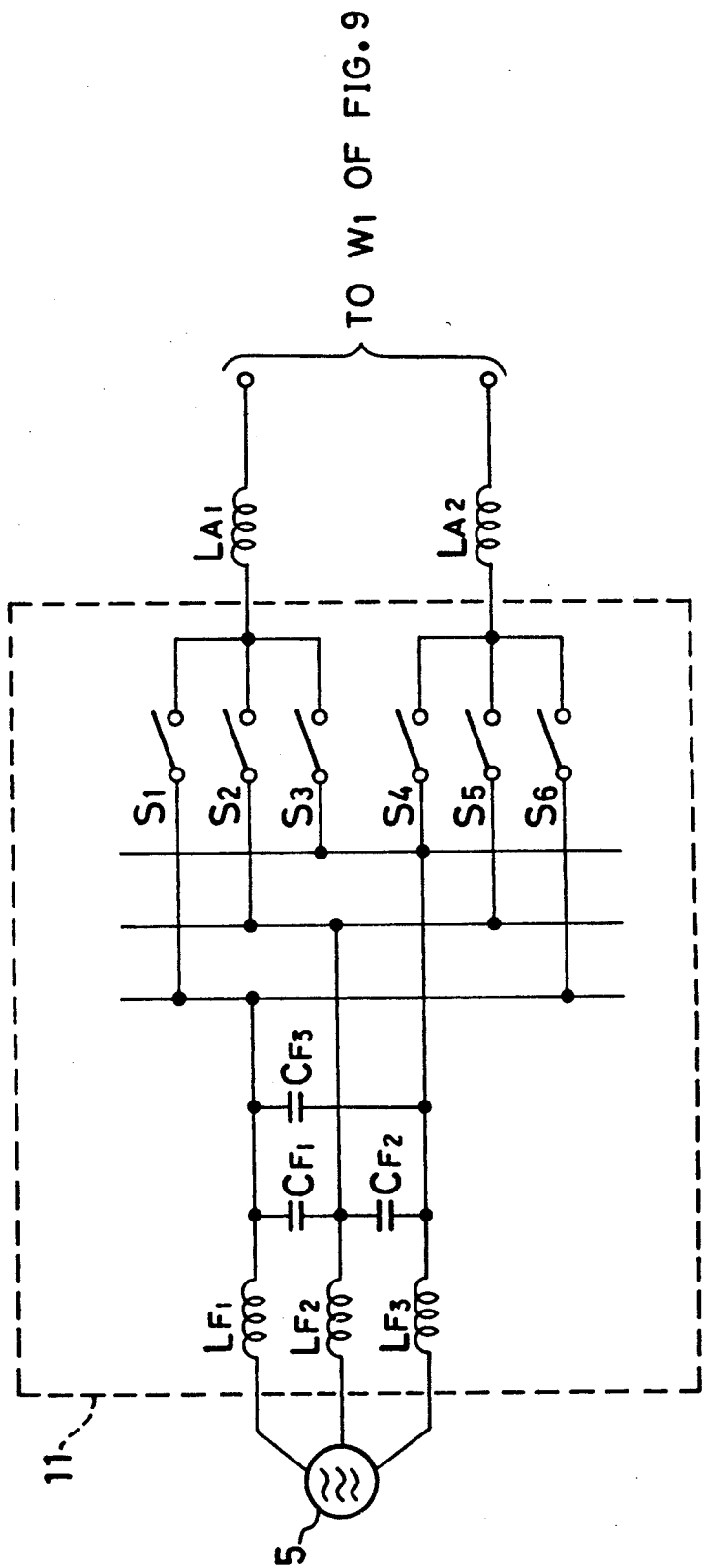
FIG. 11 is a circuit diagram showing another embodiment which converts commercial power into high-frequency power.

Although the embodiment of FIG. 6 has the converting device 11 constructed by a combination of the rectifier 11-B and inverter 11-A, it may be replaced by a 3-to-2 phase converting cycloconverter as shown in FIG. 11. Switches S1 through S6 in the figure may be of the type shown in FIG. 7.

Figure 12:
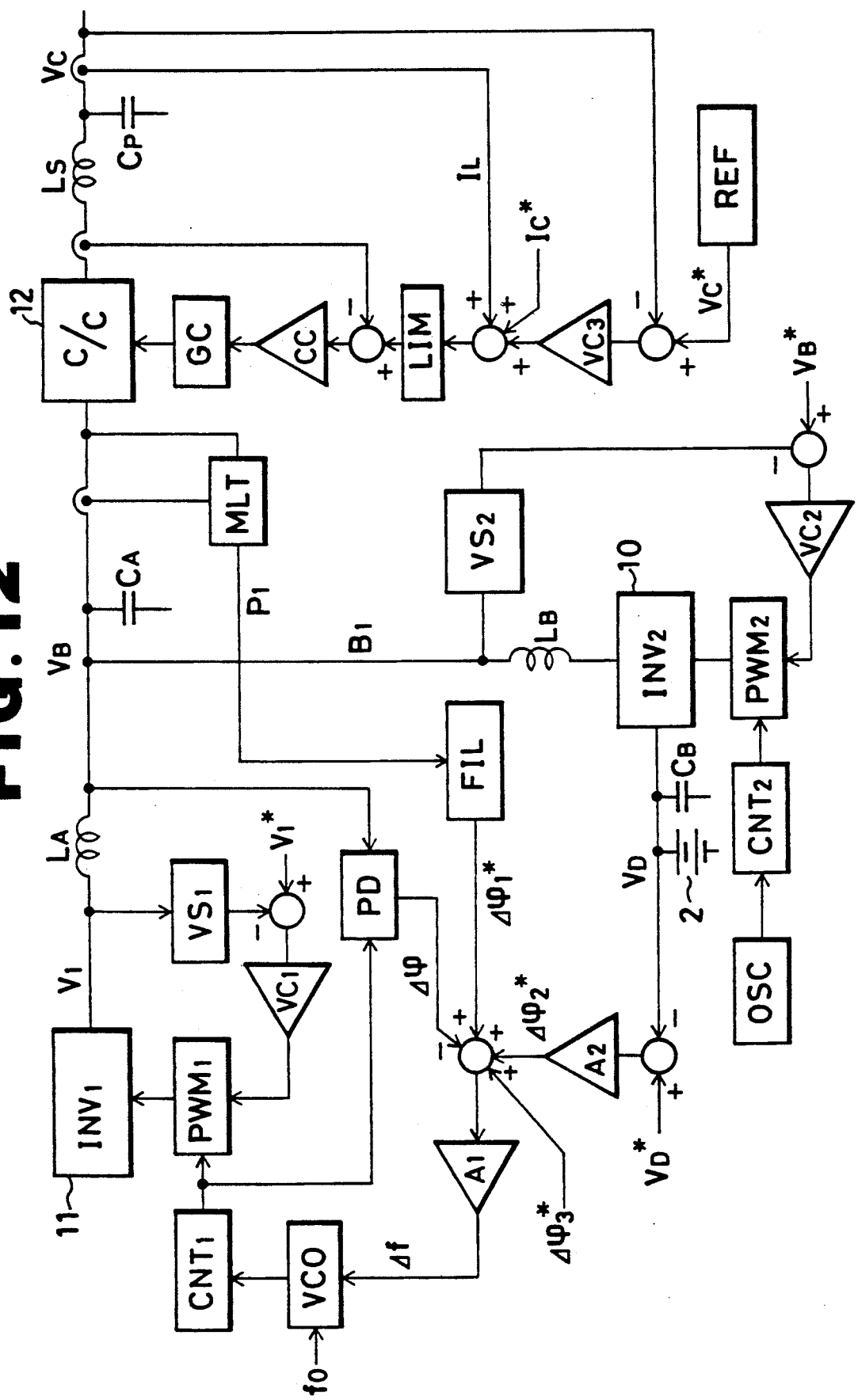
FIG. 12 is a block diagram showing the inventive control circuit for the a.c. power supply apparatus.

Next, the control circuit of the inventive a.c. power supply apparatus will be described with reference to FIG. 12. In this embodiment, the bus $B_1$ has a single-phase sinusoidal waveform of high frequency $f_1$ under constant-voltage, constant-frequency control by the inverter 10, and the cycloconverter 12 and inverter 11 are controlled with reference to the bus voltage. Transformers are omitted for simplification.

The inverter 10 is of the single-phase bridge type and operates to regulate the voltage of the bus $B_1$ under control of a 1-pulse PWM signal. The inverter 10 has its operating frequency fixed by an oscillator OSC. A voltage controller $VC_2$ controls the output pulse width of PWM2 in accordance with a feedback signal provided by a voltage sensor $VS_2$, thereby maintaining the bus voltage $V_B$ constant.

The cycloconverter 12 performs phase control for the sinusoidal single-phase power on the bus $B_1$ to produce single-phase 60 Hz sinusoidal-wave power. With the bus $B_1$ having a sufficiently high frequency of 600 Hz or above relative to the 60 Hz output frequency, a filter formed of a relatively small reactor $L_s$ and capacitor $C_p$ can remove harmonics enough to produce a sinusoidal wave with a distortion factor of 8–5% or less, in general.

The cycloconverter control circuit is provided with a minor loop for controlling the instantaneous value of the output current. By providing a reference current of $Ic^* = Icm \cos \omega t = \omega C_p Vcm \cos \omega t$ for the output filter capacitor $C_p$ current, the no-load voltage is established.

The load current $I_L$ is fed forward so that the apparatus is responsive to the load variations and operates as a low-impedance voltage source. Finally, a sinusoidal voltage reference generator REF produces a voltage reference $Vc^* = Vcm \sin \omega t$, and the voltage controller $VC_3$ operates to nullify the difference between the actual voltage and the reference voltage.

The sum of these three signals is limited by a limiter LIM below the allowable current of the cycloconverter, and the limited sum is applied a reference value to the current minor loop. Consequently, the cycloconverter 12 produces 60 Hz sinusoidal single-phase power from the single-phase high-frequency power established on the bus $B_1$.

Next, the control of the inverter 11 which supplies demanded power to the system will be described. The inverter 11 has its frequency and phase determined by a voltage-controlled oscillator VCO. The VCO has a center frequency set to $f_0 = mf_1$ and, after it is divided to $f$ by an m-bit counter $CNT_1$, it is fed to a modulation circuit $PWM_1$. The PWM circuit issues a 1-pulse PWM signal to the inverter 11, thereby controlling the output voltage of the inverter 11. The voltage control is intended to bring the mean value of voltage $V_1$ at the front of the reactor $L_A$ equal to the reference value $V_1^*$, i.e., the voltage controller $VC_1$ nullifies the signal $V_1^* - V_1$ based on the mean value of $V_1$ provided by the voltage sensor $VS_1$.

The center phase of the generated voltage $V_1$ of the inverter 11 is evaluated from $CNT_1$, and the lead angle $\Delta\phi$ relative to the bus $B_1$ voltage $V_B$ is detected by a phase detector PD. A PPL amplifier $A_1$ controls for $\Delta\phi$ in correspondence to the demanded power. Since most of the demanded power of the system is the input to the cycloconverter 12, the power $P_1$ is evaluated by a multiplier MLT and, after being smoothed by a filter FIL, applied to the PLL amplifier $A_1$ as the phase difference command $\Delta\phi_1^*$.

For charging the battery 2, an amplifier $A_2$ is operated so that the difference between the actual value $V_D$ and voltage command $V_D^*$ is nullified, and a phase signal $\Delta\phi_2^*$ corresponding to the charging power is applied to the PLL amplifier $A_1$. Furthermore, a phase differential angle signal $\Delta\phi_3^*$ for compensating the no-load loss of the inverter 10 is applied as a bias to the PLL amplifier $A_1$. In this way, the PLL amplifier $A_1$ finely adjusts the frequency of the oscillator VCO, and the $INV_1$ supplies the system demand power to the bus B.

What is claimed is:

1. An a.c. power supply apparatus, comprising:

a first controllable converting device which receives a.c. power of a first frequency from a power source, converts the frequency of said a.c. power into a second frequency higher than said first frequency, converts the voltage of said a.c. power to a value equal to a demanded system power control signal, thereby providing converted a.c. power, and provides said converted a.c. power to a bus;

a second voltage inverter type converting device which receives d.c. power and converts said d.c. power into a.c. power of said second frequency and provides said converted d.c. power to said bus, and converts a.c. power from said bus into d.c. power to charge a battery, said second converting device being responsive to a voltage control signal for controlling the voltage level of said converted a.c. and d.c. power;

a third converting device which is supplied with a.c. power of said second frequency from one of said first and second converting devices through said bus, converts the supplied power into a.c. power of a third frequency, and provides the a.c. power of said third frequency to a load; and control means for evaluating demanded system power based on said a.c. power provided to said load and said d.c. power to charge said battery, developing said demanded system power control signal, and supplying said system power control signal to said first controllable converting device.

2. An a.c. power supply apparatus according to claim 1, further comprising:

reactor means for eliminating harmonic frequencies of said source a.c. power connected between an output terminal of said first converting device and said bus; and capacitor means connected across input terminals of said third converting device for smoothing said converted power from said second converting device.

3. An a.c. power supply apparatus according to claim 1, wherein said first converting device includes a diode rectifier, a voltage-type inverter and a capacitor.

4. An a.c. power supply apparatus according to claim 2, wherein said reactor means has an impedance ranging from several percent P.U. to 30 percent P.U.

5. An a.c. power supply apparatus according to claim 1, wherein each of said first and second converting devices comprises a 3-phase sinusoidal-wave inverter.

6. An a.c. power supply apparatus according to claim 1, wherein said third converting device comprises a cycloconverter of the line commutation type.

7. An a.c. power supply apparatus according to claim 2, wherein said second converting device controls the voltage and the frequency of a voltage across said capacitor means;

said first converting device controls the phase angle of output voltage according to said demanded system power of said third converting device and the d.c. side voltage of said second converting device;

and said third converting device produces sinusoidal a.c. power from high frequency power established in said capacitor means, and controls the voltage and the frequency of said sinusoidal a.c. power constantly.

8. An a.c. power supply apparatus according to claim 1, wherein said third converting device comprises a cycloconverter of the self-commutation type.

* * * * *

UNITED STATES PATENT AND TRADEMARK OFFICE
CERTIFICATE OF CORRECTION

PATENT NO. : 5,198,970

DATED : March 30, 1993

INVENTOR(S) : Takao Kawabata et al.

It is certified that error appears in the above-identified patent and that said Letters Patent is hereby corrected as shown below:

On the cover page, in the right-hand column, under "OTHER PUBLICATIONS", "Converence" should be --Conference--.

Column 3, line 3, delete "a";
line 54, after "voltage" delete the comma ",".

Column 4, line 37, "the." should be --the period--.

Column 5, line 32, after "inverter" insert --and a 3-phase converter, respectively--;
line 43, after "power" insert --on the output--.

Column 6, line 37, "fby" should be --$f_1$ by--;
line 49, "PPL" should be --PLL--.

Column 8, line 25, "the" should be --a--.
Col. 5, lines 33 and 34, delete "and a 3-phase converter, respectively".

Signed and Sealed this

Twenty-sixth Day of July, 1994

Attest:

BRUCE LEHMAN

*Attesting Officer*  *Commissioner of Patents and Trademarks*